M. MOLITOR.
HARVESTER ATTACHMENT.
APPLICATION FILED JAN. 23, 1909.
937,085.
Patented Oct. 19, 1909.
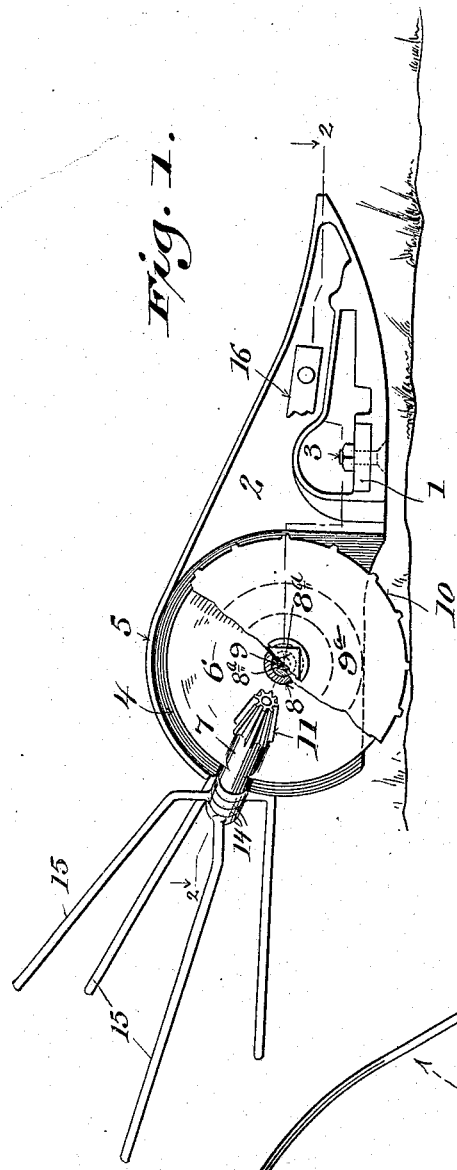
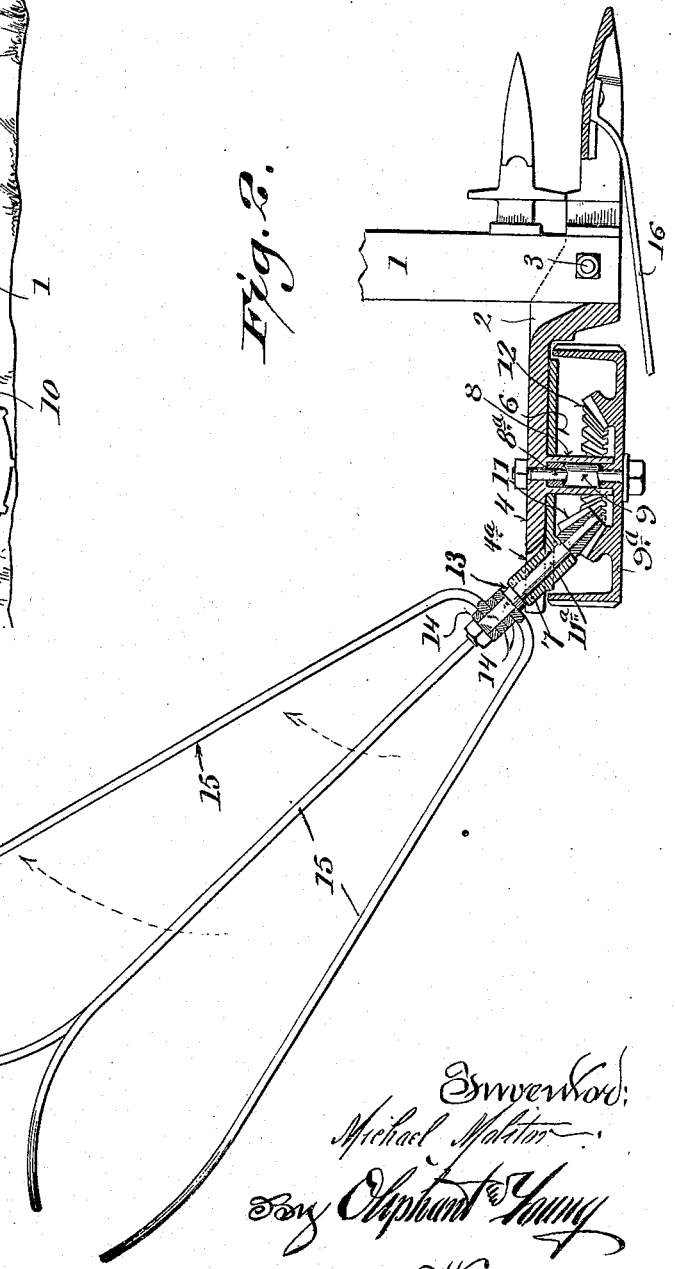

UNITED STATES PATENT OFFICE.

MICHAEL MOLITOR, OF CALVARY, WISCONSIN.

HARVESTER ATTACHMENT.

937,085. Specification of Letters Patent. Patented Oct. 19, 1909.

Application filed January 23, 1909. Serial No. 473,827.

*To all whom it may concern:*

Be it known that I, MICHAEL MOLITOR, a citizen of the United States, and resident of Calvary, in the county of Fond du Lac and State of Wisconsin, have invented certain new and useful Improvements in Harvester Attachments; and I do hereby declare that the following is a full, clear, and exact description thereof.

The object of my invention is to provide a simple and effective attachment for harvesters of the mower-type, whereby cut grain or grass of the swath adjacent that which is standing is cleared therefrom and formed into a windrow at a sufficient distance from the standing material, so that upon the next cut of the mower there is an unobstructed path in which the draft animal can travel and at the same time the clearing prevents the inner-shoe, which carries the cutting apparatus, from chucking or delivering the already cut material to the knives. The construction and arrangement of the attachment are such that the aforesaid clearing is effected by a reel, comprising a series of positively driven rods carried by a spindle, which spindle is in bevel-gear connection with a traction-wheel in connection with the outside shoe or divider of the mower.

The invention therefore consists in various structural features and combination of parts as hereinafter set forth with reference to the accompanying drawings and subsequently claimed.

In the drawings: Figure 1 represents a side elevation of a divider having attached thereto a track clearing device embodying the features of my invention, parts being broken away and parts in section to better illustrate the structural features, and Fig. 2, a plan view of the same, as indicated by line 2—2 of the preceding figure.

Referring by numerals to the drawings, 1 indicates a portion of a finger-bar, which carries the usual guard-fingers and cutting-apparatus of a mower, the finger-bar being seated in and secured to an outer divider 2, by means of a single bolt 3, as shown. The rearward vertical blade portion 4 of the divider is slightly offset from the body thereof and is circular in contour, being provided with a guard-flange 5 upon its upper periphery, which flange extends to the forward end of said divider. Loosely fitted to the outer face of the circular blade-portion 4 of the divider, is a disk 6, which disk has a hub 7 projecting therefrom at an angle to its face, and is adapted to fit within a peripheral recess 4ª of the blade-portion 4, whereby the disk and its hub are held against vertical displacement. The disk 6 is centrally apertured and supported upon a sleeve 8 extending from the blade-portion of the divider and concentric with its circular end. This sleeve constitutes a bearing for the hub of a traction-wheel 9ª, which wheel is secured thereto by a bolt 8ª, the wheel being formed with a lagged tread-flange 10 that extends inwardly and terminates adjacent to the face of the divider blade. The tread flange thus constitutes a housing for a bevel pinion 11 that meshes with a bevel gear-wheel 12 forming part of the traction-wheel, the bevel-pinion being fast on a spindle 11ª mounted in the disk-hub 7.

A collar 13 fast on the spindle prevents end-play thereof in its bearing and extending outwardly from the collar is a squared shank, upon which squared shank is fitted a series of eyes 14 having squared apertures corresponding to the squared shank of the spindle. Each eye forms part of a rod 15 that is flared outwardly therefrom, and together these rods constitute a skeleton cone shaped figure about the axis of the shank, the free ends of the rods being curved in the opposite direction from that which they are designed to revolve, whereby the grain or material in which they operate will not be caught or entangled by said ends as they engage the latter. All of the eye-portions of the rods are held in clamped position upon the squared shank, by a suitable nut, which nut is in threaded engagement with a correspondingly threaded end of said shank.

One or more guard-strips 16 may be attached to the divider as shown, to protect the traction-wheel 9 from catching in the material and also serving to further divide the fallen grain from that which is standing, these strips however are common in the art and form no part of my invention. The guard-flange 5 of the divider, as shown, also extends partly around and over the traction-wheel to protect the same from the material being cut.

By employing the described fastening means for the rods 15 in connection with the spindle shank, it will be seen that the same may readily be detached for the purpose of substituting sets of rods, whose lengths are determined by the work to be performed and the nature of the material to be cut. It will also be observed that the axis of the bevel-pinion is at such an angle to the wheel-axis, that the flared rods, which together form a reel, project diagonally across the path of travel of the cutting-mechanism of the mower and rearward of same, this angle being more or less optional and depends upon the nature of the work required and the width of the track desired to be cleared.

By constructing the disk 6 and its hub detachable from the divider, the parts are rendered more simple in their manufacture and also facilitates alinement and mesh of the gearing, the recess in the circular blade-portion 4 being designed to engage and prevent turning of the disk, while the lags upon the tread of the wheel prevent the latter from slipping under the driving strain required to impart positive rotation to the reel. The divider as a whole is manufactured and arranged, as shown, to be attached to various standard makes of mowers, by a single bolt, the attachment being effected in so simple a manner as not to require the assistance of a skilled mechanic.

From the foregoing it is evident that when the machine is in operation, the cut grain or grass in the line of travel of the reel will be caught by the same and be rolled or thrown into a windrow as it is shed from the revolving reel rod ends, the revolution of which wheel can not be stopped owing to the volume of grass, due to the fact that said reel is positively rotated by motion transmitted thereto from the traction-wheel. Thus a clear track adjacent to the standing grain or grass is obtained, whereby the work is materially facilitated.

I claim:

An attachment for harvesters, comprising an outer divider attachable to the harvester finger-bar, a stud extending from the divider, a disk fitted over the stud, the disk being provided with a bearing-hub at an angle to the stud, a spindle mounted in the disk-hub provided with a squared shank extension, a bevel pinion secured to one end of the spindle, rods having squared apertured ends fitted over the squared shank extension of the spindle, the rods forming a skeleton-cone with relation to the spindle axis, a traction-wheel mounted upon said stud provided with a flanged tread, and an internal bevel-wheel in connection with the traction-wheel for engagement with the bevel-pinion of the spindle.

In testimony that I claim the foregoing I have hereunto set my hand at Calvary in the county of Fond du Lac and State of Wisconsin in the presence of two witnesses.

MICHAEL MOLITOR.

Witnesses:
JOHN L. BEAN,
JOHN HILLEBRAND.